US006991763B2

(12) United States Patent
Connelly et al.

(10) Patent No.: US 6,991,763 B2
(45) Date of Patent: Jan. 31, 2006

(54) POLYMER PROCESS (75) Inventors: Michael Raymond Connelly, Crown Point, IN (US); Dennis Patrick Stack, Warrington, PA (US); Richard Shu-Hua Wu, Fort Washington, PA (US); Ronald Ray Zimmer, Nescopeck, PA (US)

(73) Assignee: Rohm and Haas Company, Philadelphia, PA (US)

( * ) Notice: Subject to any disclaimer, the term of this patent is extended or adjusted under 35 U.S.C. 154(b) by 864 days.

(21) Appl. No.: 09/825,715

(22) Filed: Apr. 4, 2001

(65) Prior Publication Data

US 2002/0001547 A1    Jan. 3, 2002

Related U.S. Application Data

(60) Provisional application No. 60/199,888, filed on Apr. 26, 2000.

(51) Int. Cl.
*G01N 21/00* (2006.01)
*G05D 23/00* (2006.01)

(52) U.S. Cl. .................. 422/62; 422/109; 422/110; 422/105; 422/108; 422/11; 700/266

(58) Field of Classification Search .................. 422/62, 422/110, 105, 108, 11; 700/266
See application file for complete search history.

(56) References Cited

U.S. PATENT DOCUMENTS

| | | | | |
|---|---|---|---|---|
| 4,241,230 A | * | 12/1980 | Drinkard | 585/259 |
| 4,249,907 A | * | 2/1981 | Callejas | 585/259 |
| 4,249,908 A | * | 2/1981 | Funk | 700/32 |
| 4,329,150 A | * | 5/1982 | Drinkard | 436/157 |
| 4,491,924 A | | 1/1985 | Agarwal | 364/500 |
| 4,742,472 A | | 5/1988 | Sugimori et al. | 364/500 |
| 6,498,219 B1 | | 12/2002 | Kröner et al. | 526/61 |

FOREIGN PATENT DOCUMENTS

| | | |
|---|---|---|
| EP | 0 071 988 B1 | 2/1983 |
| EP | 0 111 341 A2 | 6/1984 |
| EP | 0 486 262 A1 | 5/1992 |
| EP | 0 561 078 A2 | 9/1993 |
| GB | 1 549 841 | 8/1979 |

OTHER PUBLICATIONS

Alexander S. Dunn, in "Emulsion Polymerization and Emulsion Polymers"; Peter A. Lovell et al., Eds.; pp. 144-145, 160-193; John Wiley & Sons Ltd. 1997.

"Combined Feedforward-Feedback Servo Control Scheme for an Exothermic Batch Reactor", Arthur Jutan and Ashok Uppal ;Ind. Eng. Chem. Process Des. Dev. 1984, pp. 5907-5602.

"On-Line Calorimetric Control of Emulsion Polymerization Reactors", I. Saenz De Buruaga, M. Arotcarena, P.D. Armitage, L. M. Gugliotta, J. R. Leiza and J. M. Asua; Chemical Engineering Science vol. 51, No. 11, pp. 2781-2786, 1996.

"Control of Particle Size Distribution Through Emulsifier Metering Based on Rate of Conversion", Daniel L. Gordon and Karl R. Weidner, ACS Sym, Ser (1981), 16, Emulsion Polym. Emulsion Polymerizations.

(Continued)

*Primary Examiner*—Glenn Caldarola
*Assistant Examiner*—Alexis Wachtel (57) ABSTRACT

Disclosed is a process for controlling the level of in-process monomer in an emulsion polymerization reaction. Also disclosed is a method of controlling particle size by controlling the level of in-process monomer.

3 Claims, 3 Drawing Sheets

OTHER PUBLICATIONS

"On-Line Control of a Semibatch Emulsion Polymerization Reactor Based on Calorimetry", Isabel Sáenz de Buruaga, Antonio Echevarria, Philip D. Armitage, José C. de la Cal. José R. Leiza, and José M. Asua, AIChE Journal, Apr. 1997, vol. 43, No. 4.

"Temperature Control Principles for Process Engineers", Eugene P. Dougherty, Munich; Vienna; New York: Hanser 1993 ISBN 3-445-15980-0.

"Dynamic Thermal Analyzer For Monitoring Batch Processes", Richard S. H. Wu, CEP, Sep. 1985.

"On-Line Diagnosis during Polymer Production for Safety and Quality Control", Chr.-U.Schmidt, H. Schuler, BASF Ag. Ludwigshafen, Dechema-Monographien Band 127—VCH Verlagsgesellschaft 1992.

* cited by examiner

FIG. 3

006
POLYMER PROCESS

This application claims priority to U.S. provisional application 60/199,888 filed Apr. 26, 2000.

BACKGROUND OF THE INVENTION

This invention relates generally to a process for preparing polymers. In particular, this invention relates to a process for controlling monomer levels in an emulsion polymerization reaction.

Polymerization reactions are complex chemical processes that require monitoring throughout the course of the reaction to ensure the desired polymer product is obtained. Traditionally, such monitoring was accomplished manually, either by analyzing the final polymer product and adjusting the necessary parameters for the next reaction batch or by taking samples during polymerization and analyzing them by any of a variety of techniques, such as by gas-liquid chromatography. However, it typically takes between 3 and 20 minutes to complete an analysis on a sample taken during the polymerization. By the time such results are obtained, it is typically too late to correct any problems with the polymerization and the entire batch may be ruined.

A solution to this problem is a real-time, on-line analysis of the course of the reaction. Typically, such on-line analyses monitor the heat generated during the course of the reaction and compare this number to a theoretical value. This difference is used to adjust such process parameters as temperature of the reaction, the amount of polymerization initiator added, the amount of monomer added and the like. For example, U.S. Pat. No. 4,742,472 (Sugimori et al.) discloses a method of controlling the temperature of an emulsion polymerization, thus resulting in a polymer having a uniform particle size.

European Patent Application 486 262 A (Baily et al.) discloses a method of adjusting the feeds of reactants or reaction temperature in order to move the polymerization reaction toward a theoretical model of the best course of the reaction, and preventing a buildup of unreacted monomer, thus increasing the safety of the reaction.

Gordon et al., *Control of Particle Size Distribution Through Emulsifier Metering Based on Rate of Conversion*, Emulsion Polymers and Emulsion Polymerization, American Chemical Society Symposium Series, 515–532, 1981, discloses that particle size distribution in an emulsion polymerization can be controlled by controlling the amount of emulsifier present at all times during the polymerization. In this article, the emulsifier is added to the polymerization reaction separately from the monomers.

However, known on-line polymerization analyses and control methods do not completely control the extent of polymerization in the early stages of a polymerization reaction. For example, such methods do not adequately account for the cooling medium present in a reactor cooling jacket at the initiation of polymerization, resulting in a large spike in the reaction. Such large spike is far from the true heat transfer rate from the reactor contents when the cooling medium is first turned on.

Wu in, *Dynamic Thermal Analyzer for Monitoring Batch Processes*, Chem. Eng. Prog., 81, pages 57–61 (1985) discloses using material/energy balance as a way of monitoring chemical reactions. This article does not disclose a method of adequately accounting for the cooling medium present in a reactor cooling jacket at the initiation of polymerization.

There is thus a continuing need for on-line reaction monitoring methods that provide real-time analyses of the reaction and provide accurate heat transfer rates from the reactor contents to the cooling medium when the flow of the cooling medium is first started, i.e. at the initiation of the polymerization reaction.

SUMMARY OF THE INVENTION

In a first aspect, the present invention provides a method of controlling particle size of an emulsion polymer including the step of controlling the amount of standing monomer present during the polymerization reaction.

In a second aspect, the present invention provides a method of controlling the properties of an emulsion polymer including the step of controlling the amount of standing monomer present during the polymerization reaction.

In a third aspect, the present invention provides a method of controlling standing monomer level in a polymerization reaction including the steps of a) detecting coolant temperature at a cooling jacket inlet; b) detecting coolant temperature at a cooling jacket outlet; c) detecting coolant flow rate; d) calculating $Q_{jdyn}$ (raw) and $U_{raw}$ wherein $U_{raw}$ is capped such that $U_{min} < U_{raw} < U_{max}$; e) obtaining $U_{filt}$ by inputting $U_{raw}$ into a low pass first order filter; f) calculating a value for the dynamic jacket heat removal; g) calculating a heat release value of polymerization using the dynamic jacket heat removal value; h) comparing the calculated heat release value of polymerization to a target heat release value of polymerization; i) calculating the level of in-process monomer in the polymerization reaction; and j) controlling the rate of monomer addition to the polymerization reaction such that a desired level of in-process monomer is maintained.

In a fourth aspect, this invention is directed to an apparatus for controlling standing monomer level in a polymerization reaction including: a) temperature detecting means for detecting coolant temperature at a cooling jacket inlet; b) temperature detecting means for detecting coolant temperature at a cooling jacket outlet; c) detecting means for detecting coolant flow rate; d) computing means for calculating $Q_{jdyn}$ (raw) and $U_{raw}$ wherein $U_{raw}$ is capped such that $U_{min} < U_{raw} < U_{max}$; e) means for obtaining $U_{filt}$ by inputting $U_{raw}$ into a low pass first order filter; f) means for calculating a value for the dynamic jacket heat removal; g) means for calculating a heat release value of polymerization using the dynamic jacket heat removal value; h) means for calculating a difference between the calculated heat release value of polymerization and a target heat release value of polymerization; i) computing means for determining the level of in-process monomer in the polymerization reaction; and j) controlling means for controlling the rate of monomer addition to the reactor such that a desired level of in-process monomer is maintained.

DETAILED DESCRIPTION OF THE INVENTION

As used throughout this specification, the following abbreviations shall have the following meanings, unless the context clearly indicates otherwise: min.=minute; % wt=percent by weight; nm=nanometer; °C.=degrees Centigrade; BTU=British thermal unit; ft=foot; and cps=centipoise.

The term "(meth)acrylic" refers to both acrylic and methacrylic and the term "(meth)acrylate" refers to both acrylate and methacrylate. The term "(meth)acrylamide" refers to both acrylamide and methacrylamide.

Unless otherwise noted, all amounts are percent by weight and all ratios are by weight. All numerical ranges are inclusive.

The present invention relates to the monitoring and control of in-process monomer levels, also known as standing monomer levels or "SML", in polymerization reactions. The terms "in-process monomer level" and "standing monomer level" are used interchangeably throughout this specification. The present invention is particularly suitable for controlling the standing monomer level in suspension and emulsion polymerization reactions. In-process monomer level refers to the amount of unreacted monomer at a given time in the polymerization reactor.

The monomers useful in the present invention are any ethylenically or acetylenically unsaturated monomer. Preferred monomers are ethylenically unsaturated. Suitable monomers include, but are not limited to: (meth)acrylic acid, (meth)acrylamides, alkyl (meth)acrylates, vinyl aromatic monomers, vinyl alcohol esters, nitrogen-containing ring compounds and their thio-analogs, and substituted ethylene monomers. It is preferred that at least one monomer is a (meth)acrylic acid, (meth)acrylamide, alkyl (meth)acrylate, vinyl aromatic monomer or vinyl alcohol ester.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates. "Low cut" alkyl (meth) acrylates are typically those where the alkyl group contains from 1 to 6 carbon atoms. Suitable low cut alkyl (meth) acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Particularly useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate (commonly referred to as "LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Particularly useful mixtures of high cut alkyl (meth)acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical company, i.e., ALFOL 1618 and ALFOL 1620, Ziegler catalyzed various NEODOL alcohols from Shell Chemical Company, i.e. NEODOL 25L, and naturally derived alcohols such as Procter & Gamble's TA-1618 and CO-1270. Consequently, for the purposes of this invention, alkyl (meth) acrylate is intended to include not only the individual alkyl (meth)acrylate product named, but also to include mixtures of the alkyl (meth)acrylates with a predominant amount of the particular alkyl (meth)acrylate named.

The alkyl (meth)acrylate monomers useful in the present invention may be a single monomer or a mixture having different numbers of carbon atoms in the alkyl portion. Also, the (meth)acrylamide and alkyl (meth)acrylate monomers useful in the present invention may optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Particularly useful substituted alkyl (meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or HPMA.

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate, dimethylaminoethyl acrylate, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri($C_1$–$C_6$)alkylsilyl (meth)acrylate, γ-propyl di($C_1$–$C_6$)alkoxy ($C_1$–$C_6$)alkylsilyl (meth)acrylate, γ-propyl di($C_1$–$C_6$)alkyl ($C_1$–$C_6$)alkoxysilyl (meth)acrylate, vinyl tri($C_1$-$C_6$)alkoxysilyl (meth)acrylate, vinyl di($C_1$–$C_6$)alkoxy($C_1$–$C_6$)alkylsilyl (meth)acrylate, vinyl ($C_1$–$C_6$)alkoxydi($C_1$–$C_6$)alkylsilyl (meth)acrylate, vinyl tri($C_1$–$C_6$)alkylsilyl (meth)acrylate, and mixtures thereof.

The vinylaromatic monomers useful as ethylenically unsaturated monomers in the present invention include, but are not limited to: styrene, α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$)alkyl, carb($C_1$–$C_{10}$)alkoxy, carboxy, amino, ($C_1$–$C_{10}$)alkylamino derivatives and the like.

The vinyl alcohol ester monomers useful as ethylenically unsaturated monomers in the present invention include, but are not limited to, vinyl acetate, vinyl propionate and vinyl versatate.

The nitrogen-containing ring compounds and their thioanalogs useful as ethylenically unsaturated monomers in the present invention include, but are not limited to: vinylpyridines such as 2-vinylpyridine or 4-vinylpyridine; lower alkyl ($C_1$–$C_8$) substituted C-vinyl pyridines such as 2-methyl-5-vinyl-pyridine, 2-ethyl-5-vinylpyridine, 3-methyl-5-vinylpyridine, 2,3-dimethyl-5-vinyl-pyridine, and 2-methyl-3-ethyl-5-vinylpyridine, methyl-substituted quinolines and isoquinolines, N-vinylcaprolactam, N-vinylbutyrolactam, N-vinylpyrrolidone, vinyl imidazole, N-vinyl carbazole, N-vinyl-succinimide, acrylonitrile, o-, m-, or p-aminostyrene, maleimide, N-vinyl-oxazolidone, N,N-dimethyl aminoethyl-vinyl-ether, ethyl-2-cyano acrylate, vinyl acetonitrile, and N-vinylphthalimide, and N-vinyl-pyrrolidones such as N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone, 3,4,5-trimethyl-1-vinyl-pyrrolidone.

The substituted ethylene monomers useful as ethylenically unsaturated monomers is in the present invention include, but are not limited to: vinyl acetate, vinyl formamide, vinyl chloride, vinyl fluoride, vinyl bromide, vinylidene chloride, vinylidene fluoride, vinylidene bromide, acrylonitrile and methacrylonitrile.

The polymerization reaction of the present invention may optionally contain one or more cross-linking agents. Suitable cross-linking agents include, but are not limited to: di-, tri-, tetra-, or penta-ethylenically unsaturated monomers. Examples of cross-linkers useful in the present invention include, but are not limited to: trivinylbenzene, divinyltoluene, divinylpyridine, divinylnaphthalene and divinylxylene; and such as ethyleneglycol diacrylate, ethyleneglycol dimethacrylate, trimethylolpropane triacrylate, diethyleneglycol divinyl ether, trivinylcyclohexane, allyl methacrylate ("ALMA"), ethylene glycol dimethacrylate ("EGDMA"), trimethylolpropane trimethacrylate ("TMPTMA"), divinyl benzene ("DVB"), glycidyl methacrylate, 2,2-dimethylpropane 1,3 diacrylate, 1,3-butylene glycol diacrylate, 1,3-butylene glycol dimethacrylate, 1,4-butanediol diacrylate, 1,4-butanediol dimethacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, and mixtures thereof.

When a cross-linker is used in the polymerization reactions of the present invention, the cross-linker may be added to the reaction in any way. For example, the cross-linker may be added separately to the polymerization, combined with one monomer and then added to the polymerization or pre-emulsified and then added to the polymerization as an emulsion. One skilled in the art will appreciate which method of cross-linker addition is suitable for a given polymerization.

The emulsion polymerization of the present invention may be performed by any emulsion polymerization techniques. It is preferred that the monomers be pre-emulsified prior to adding them to the reactor. When pre-emulsifying the monomers in the present invention, the monomer is typically combined in any order with one or more emulsifying agents and water.

Suitable surfactants for use in the emulsion polymerizations of the present invention include all anionic, cationic and nonionic surfactants that can be used in emulsion polymerization. Such surfactants include non-fluorinated and fluorinated surfactants. Mixtures of surfactants may be used, including mixtures of non-fluorinated and fluorinated surfactants. Preferred surfactants are non-fluorinated and are anionic surfactant, nonionic surfactant and mixtures thereof. Suitable nonionic surfactants include, but are not limited to: ethoxylated octylphenols; ethoxylated nonylphenols; and ethoxylated fatty alcohols. Suitable anionic surfactants include, but are not limited to: sodium lauryl sulfate; sodium dodecylbenzene sulfonate; sulfated and ethoxylated derivatives of nonylphenols, octylphenols, and fatty alcohols; and esterified sulfosuccinates. Preferred anionic surfactants are sodium lauryl sulfate, salts of fatty acids and sulfated nonylphenoxypoly(ethyleneoxide)ethanol ammonium salt. Suitable cationic surfactants include, but are not limited to: laurylpyridinium chlorides; cetyldimethyl amine acetate; and ($C_8$–$C_{18}$) alkyldimethylbenzyl-ammonium chlorides. The total amount of surfactant may be from 0.1 to 10, and is preferably from 0.5 to 5 percent by weight, based on the total weight of monomer in the monomer emulsion.

The selection of the type and amounts of cross-linking agents, the control of pH, the rate of addition of the various components, the level of solids, and temperature of reaction for the emulsion polymerization are well known to those skilled in the art of emulsion polymerization.

A free radical initiator is used in the emulsion polymerizations. Suitable free radical initiators include, but are not limited to: hydrogen peroxide; tert-butyl hydroperoxide; sodium, potassium, lithium and ammonium persulfate. A reducing agent, such as a bisulfite, including an alkali metal metabisulfite, hydrosulfite, and hyposulfite; and sodium formaldehyde sulfoxylate or an organic reducing agent, such as ascorbic acid, may be used in combination with the initiator to form a redox system. The amount of initiator may be generally from 0.01 to 2 percent by weight based on the total weight of monomer. When a redox system is used, the amount of reducing agent is generally in the range of from 0.01 to 2 percent by weight based on the total weight of monomer. Transition metal catalysts, such as iron salts, may also be used.

The polymerization temperature range is generally from 10° to 100° C. The temperature range is preferably from 75° to 90° C. in the case of persulfate systems. In the case of redox systems, the temperature range is preferably from 20° to 75° C.

The level of in-process monomer in an emulsion polymerization may have a direct impact on the quality of the resulting polymer, which may adversely affect the polymer's usefulness for specific applications. For example, in certain (meth)acrylate polymers used in coatings, the scrub performance of these polymers decreases if the in-process monomer level during the polymerization drops below a certain value. For certain (meth)acrylate polymers used in paper coatings, the pick resistance of the polymer also decreases if the in-process monomer level during the polymerization drops below a certain value. In the preparation of other (meth)acrylate polymers, a certain level of in-process monomer is necessary during the point of base addition in order for the polymer to swell properly. In still other emulsion polymerizations, the presence of too high a level of standing monomer results in polymer having reduced viscosity. Thus, the control of in-process monomer levels is important in emulsion polymerizations.

The in-process monomer level in the process of the present invention is monitored by on-line mass and energy balances. A process computer solves a set of dynamic material/energy balances, typically every 6 to 15 seconds, during the progress of the polymerization reaction. The heat removal rate of heat transfer equipment such as reactor jacket and external heat exchanger can be determined by water-side energy balance (water flow rate and water inlet and outlet temperatures). With water-side energy balance there is no problem of sample port plugging as occurs with manual sample taking. The thermal energy released by the chemical reaction can be calculated and therefore the extent of chemical reaction can be monitored.

Wu, *Dynamic Thermal Analyzer for Monitoring Batch Processes, Chem. Eng. Prog.*, 81, pages 57–61 (1985), herein incorporated by reference, discloses the use of on-line material and energy balances to monitor an exothermic batch emulsion polymerization process. However, Wu fails to provide an accurate measurement of the rate of polymerization in the early stages of a polymerization reaction. An accurate determination of the rate of polymerization is necessary in order to provide the level of in-process monomer present. According to the present invention, the rate of polymerization can be adequately determined at all times during the progress of the polymerization reaction, and in particular during the early stages of the polymerization reaction.

The jacket heat removal rate in BTU/minute is calculated by first calculating the steady state jacket heat removal according to equation (1)

$$Q_{jss} = 8.344 * Fj * (T_{jo} - T_{ji} @\text{dead time}) * 1.8 \qquad \text{Equation (1)}$$

wherein Fj is the jacket cooling water flow rate in gallons/minute; $T_{jo}$ is the jacket outlet temperature; and $T_{ji}$@dead time is the jacket inlet temperature at dead time, in minutes before current time. Dead time is defined as the time it takes for coolant to pass from the point of measurement of jacket inlet temperature to the point of the measurement of jacket outlet temperature.

Next, the sensible heat removal of the jacket is calculated according to equation (2)

$$Q_{jsens} = (W_j C_{pj}) * \frac{DT_{jo}}{dt} * 1.8 \qquad \text{Equation (2)}$$

wherein $(W_j * Cp_j)$ is the characteristic constant of a given reactor. It represents the jacket water holdup and reactor wall metal weight contribution. One skilled in the art will appreciate that such $(W_j * Cp_j)$ value can be determined by a jacket dynamic test. The value of $(W_j * Cp_j)$ does not vary from batch to batch.

The dynamic heat removal of the jacket is calculated according to equation (3).

$$Q_{jdyn}(\text{raw}) = Q_{jsens} + Q_{jss} \qquad \text{Equation (3)}$$

The raw heat transfer coefficient ($U_{raw}$) can be calculated as follows:

$$U_{raw} = \frac{Q_{jdyn}(\text{raw}) * 60}{(A)(AMTD) * 1.8} \qquad \text{Equation (4)}$$

wherein A is the reactor heat transfer area and AMTD=$T_r$−(($T_{jo}$+$T_{ji}$)/2). $U_{raw}$ is capped between $U_{max}$ (maximum heat transfer coefficient) and $U_{min}$ (minimum heat transfer coefficient). Both $U_{max}$ and $U_{min}$ should have physically realistic values. $U_{min}$ must be greater than 0. A typical value for $U^{min} = \frac{1}{20}^{th} U_{max}$.

A U value is obtained by first cleaning the polymerization reactor and then running a water cool down trial. This U value is typically used as $U_{max}$. A nominal value of $U_{max}$=140 to 160 BTU/(F*Ft$^2$*Hour) and a nominal value of $U_{min}$=10.

The capped $U_{raw}$ is inputted into a low pass first order filter to get $U_{filt}$ (a filtered value). A nominal filter constant of 1 to 2 minutes is typically used.

The dynamic heat removal of the jacket is then calculated using $U_{filt}$ according to equation (5).

$$Q_{jdyn} = \frac{U_{filt} * A * AMTD * 1.8}{60} \qquad \text{Equation (5)}$$

Figure 1:
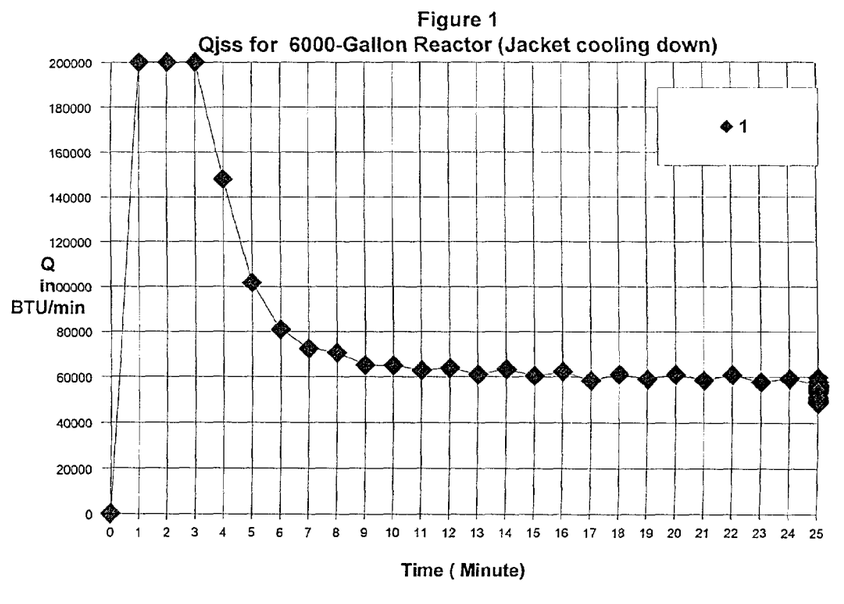
FIG. 1 shows the steady sate jacket heat removal rate, $Q_{jss}$.
Figure 2:
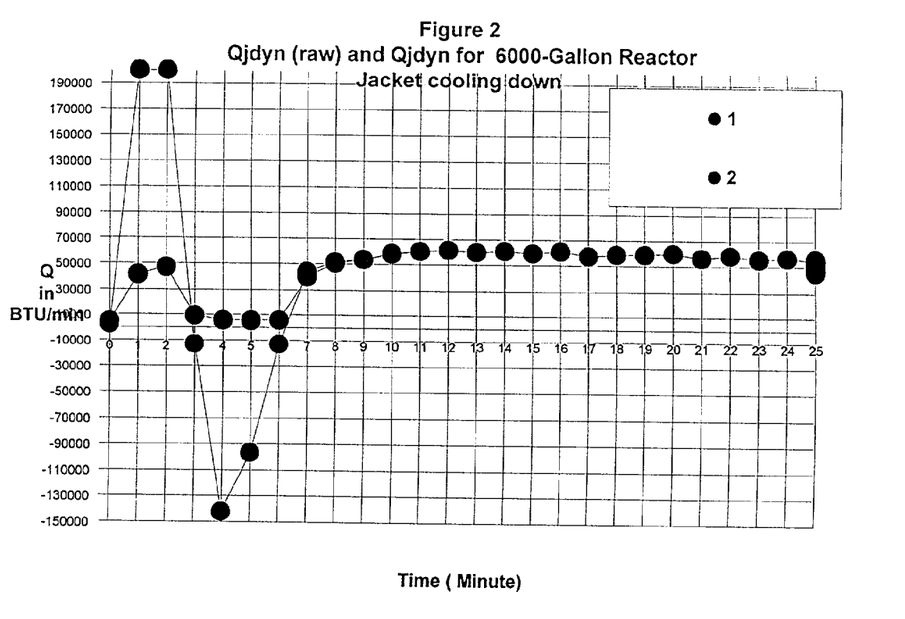
FIG. 2 shows the dynamic jacket heat removal rate, $Q_{jdyn}$ (raw) and $Q_{jdyn}$.

Both $Q_{jss}$, FIG. 1, and $Q_{jdyn}$ (raw), FIG. 2, show a large spike that is far from the true heat transfer rate from the reactor content when the cooling water first turned on. When the cooling water is first turned on, the hot water in the cooling jacket is pushed out of the jacket creating a large ($T_{jo}$−$T_{ji}$) term. This large ($T_{jo}$−$T_{ji}$) term created the large spike in $Q_{jss}$ and $Q_{jdyn}$ (raw).

The present invention avoids such large spike and $Q_{jdyn}$ follows the true heat transfer rate from the reactor contents. The present invention uses water-side energy balance to compute $Q_{jss}$ and $Q_{jdyn}$ (raw), and then $U_{raw}$ is computed. The U values are capped in the order $U_{min} < U_{raw} < U_{max}$. This step is critical because the physically meaningful value of U is known. For example, $U_{min}$ cannot be less than zero.

Polymer has the tendency to foul the polymerization reactor walls and the viscosity of polymer, polymer solution or polymer latex will increase during polymerization process. Both factors reduce the heat transfer coefficient of the reactor walls. Therefore, $U_{max}$ is typically determined by a water cooling down trial of low viscosity water in a cleaned reactor.

The algorithm used in the calculations of the present invention is insensitive to the value of $U_{max}$ as long as it is above the nominal U value. By increasing $U_{max}$ 20% and 40%, the value of $Q_{jdyn}$ follows the true heat transfer rate from the reactor contents. $Q_{jdyn}$ thus greatly reduces the errors in the rate of heat transfer calculated using $Q_{jss}$ and $Q_{jdyn}$ (raw).

Figure 3:
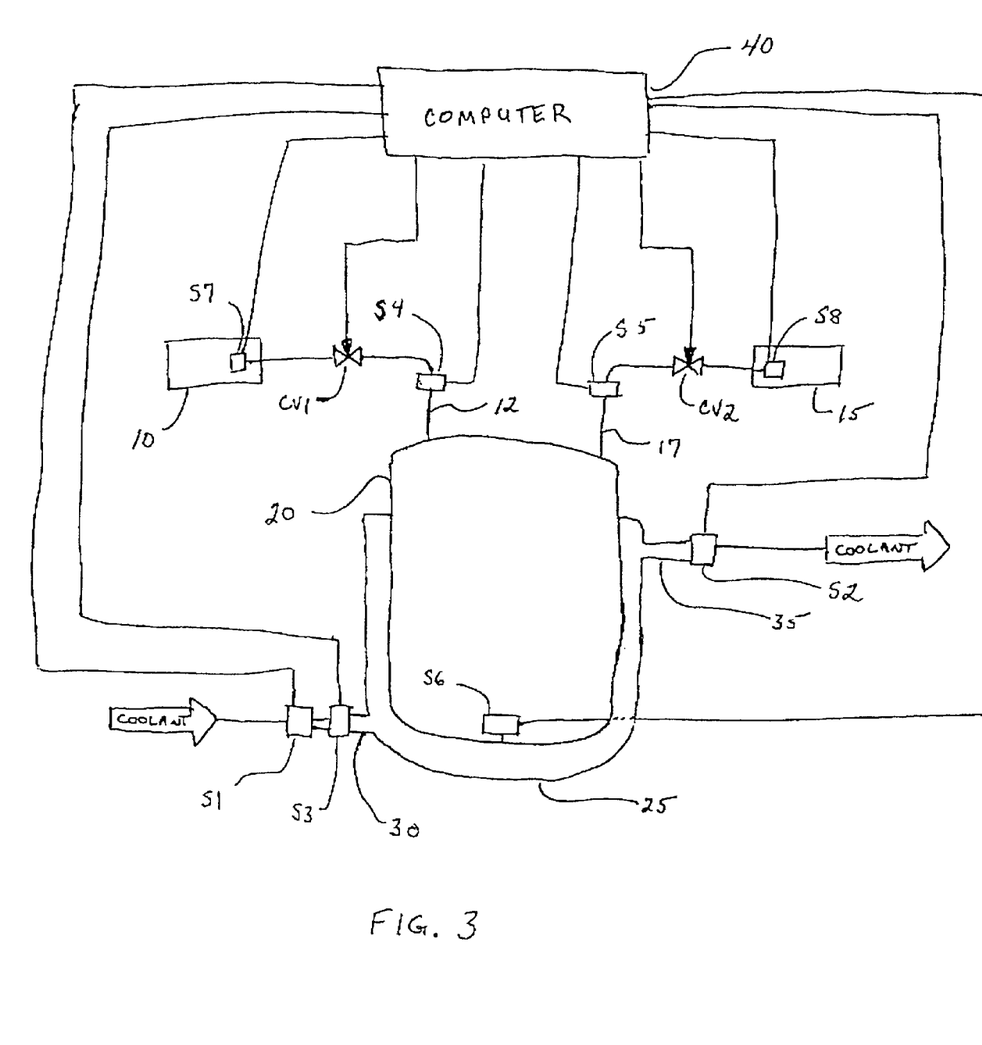
FIG. 3 shows the construction of one embodiment of an apparatus for controlling the level of in-process monomer in a polymerization reaction.

FIG. 3 shows the incomplete construction of one embodiment of an apparatus for controlling the level of in-process monomer in a polymerization reaction. It will be appreciated by those skilled in the art that an apparatus according to the present invention may further contain other components, such as reactor discharge lines, agitation means, and the like. It will be further appreciated that alternate embodiments are within the scope of one skilled in the art and are also within this invention. For example, such apparatus may have one, two or more monomer feed lines.

In the apparatus of FIG. 3, monomer or monomer emulsion is added to one or both of the monomer feed vessel 10 and catalyst feed vessel 15. The monomer from monomer feed vessel 10 passes through control valve CV1 and flow meter S4 and through feed line 12 into reaction vessel 20. The catalyst from catalyst feed vessel 15 passes through control valve CV2 and flow meter S5 and through feed line 17 into reaction vessel 20. Both control valves CV1 and CV2 control the amount of monomer and catalyst, i.e. initiator, respectively added to the reaction vessel 20. The reaction vessel is contained within cooling jacket 25 which has a coolant inlet 30 and a coolant outlet 35. As coolant enters the cooling jacket 25 through coolant inlet 30 the temperature of the coolant is measured by sensor S1 and the flow rate is measured by flow meter S3. As the coolant exits the cooling jacket 25 through coolant outlet 35 the temperature of the coolant is measured by sensor S2. Sensor S6 measures the reactor temperature. Sensor S7 measures the monomer emulsion temperature. Sensor S8 measures the catalyst temperature. All sensor and flow rate measurements are recorded in computing means 40.

Computing means 40 then calculates the rate of heat transfer as $Q_{jdyn}$, as described herein. The theoretical heat of polymerization rate ($Q_{thero}$) is:

$Q_{theo}$=Monomer feed rate * unit heat of polymerization of monomer (in BTU/minute).

The actual heat of polymerization rate, i.e. $Q_R$, in BTU/minute, can be calculated by the following equation:

$Q_R = Q_{jdyn} + Q_{fsens} + Q_{rsens}$ wherein $Q_{fsens}$=the sensible cooling of the feeds in BTU/minute=monomer emulsion feed rate * $Cp_{me}$ * $(T_r - T_{me})$+catalyst feed rate*$Cp_{cat}$*$(T_r - T_{cat})$; and wherein $T_r$ is the reactor temperature; $T_{me}$ is monomer emulsion feed temperature; $T_{cat}$ is the catalyst feed temperature; $Cp_{me}$ is the heat capacity of monomer emulsion feed; and $Cp_{cat}$ is the heat capacity of catalyst feed.

$Q_{rsens}$ is the sensible heating or cooling of reactor content, in BTU/minute, and can be calculated from the equation:

$Q_{rsens} = W_r * Cp_r * DT_r/Dt;$ wherein $DT_r/Dt$ is the reactor temperature change rate; $T_r$ is the reactor temperature; $W_r$ is the weight of reactor content; and $Cp_r$ is the heat capacity of reactor content.

The actual heat of polymerization rate ("$Q_R$") is then compared to the theoretical heat of polymerization rate ("$Q_{theo}$") in order to determine the extent of polymerization. The extent of polymerization is then compared to the amounts of monomers added to the reaction vessel 20 and the in-process monomer level is determined. The amount of in-process monomer is compared to a target value stored in computing means 40. If the in-process monomer level is greater than the target in-process monomer level, computing means 40 reduces or stops the feed of monomers or catalyst from the monomer feed vessel 10 and catalyst feed vessel 15 by adjusting the control valves CV1 and CV2 in the monomer emulsion and catalyst feed lines respectively. If the level of in-process monomer is less than the target in-process monomer level, computing means 40 will appropriately adjust the control valves CV1 and CV2 in the monomer feed and catalyst feed lines respectively such that the monomer feed and catalyst feed are increased. Thus, the level of in-process monomer may be maintained or controlled by the present invention. It is preferred, but by no means required, that the monomer to catalyst feed rates are kept in a fixed ratio.

The coolant useful in the present invention may be any that sufficiently cools the reaction and is preferably water. The cooling jacket 25 may be of any suitable design. For example, the cooling jacket may have multiple inlets and outlets. The computing means 40 may be any computer or microprocessor capable of monitoring and controlling the polymerization reaction. The control valves CV1 and CV2, sensors S1, S2, S6, S7 and S8 as well as flow meters S3, S4 and S5 are well known to those skilled in the art. Any suitable control valves and sensors may be advantageously used in the present invention. Other polymerization reaction vessel designs may be used successfully in the present invention.

The particle size of the polymer often impacts key performance properties. An advantage of the present invention is that the particle size of the final polymer product may be controlled by controlling the level of in-process monomer. In the present invention, the intermediate polymer emulsion is relatively unstable, and increased levels of in-process monomer cause this intermediate polymer to become unstable. By "unstable polymer emulsion" is meant a polymer emulsion having sufficient emulsifier to form an emulsion, but that the resulting emulsion is sensitive to the amount of surfactant, solvent, monomer and the like, such that if the amount of any of these is changed the emulsion may fall apart, i.e. cease to be an emulsion. Certain applications of emulsion polymers allow for the use of only a limited amount of surfactant in the resulting emulsion polymer, thus limiting the amount of surfactant used in the polymerization. If more surfactant is used, the properties of the resulting emulsion polymer may be adversely affected.

It has been surprisingly found that when the in-process monomer level of an unreacted monomer, particularly when the unreacted monomer is part of an unstable emulsion polymer, is greater than about 8% wt, based on the total weight of the reaction mixture, the resulting emulsion polymer has a large particle size. Accordingly, when the in-process level of an unstable polymer emulsion is less than about 8% wt, the resulting emulsion polymer has a small particle size. By "large" particle size is meant a polymer particle having a size of about 140 nm or greater. By "small" particle size is meant an emulsion polymer particle having a size of less than about 140 nm. Thus, the particle size of an emulsion polymer prepared from an unstable polymer emulsion can be controlled by controlling the level of in-process monomer.

When it is desired that the emulsion polymer has a small particle size, it is preferred that the amount of the in-process monomer be less than about 8% wt, preferably less than about 7% wt, and more preferably less than about 5% wt. When it is desired that the emulsion polymer has a large particle size, it is preferred that the amount of in-process monomer be greater than or equal to 8% wt.

Thus, the lower the level of in-process monomer, the smaller the particle size of the resulting emulsion polymer particles, particularly when an unstable polymer emulsion is used. It will be appreciated by one skilled in the art that there is a lower limit to the particle size that can be produced by controlling the in-process monomer level. Such lower limit will depend upon the choice of monomers, cross-linkers, surfactants, solvents, phase transfer catalysts, and the like.

The emulsion polymers produced by the process of the present invention are useful wherever such emulsion polymers are typically used. In addition, the better control of particle size may allow for the use of these emulsion particles in other applications where small or large particle size is preferable.

The following examples are presented to illustrate further various aspects of the present invention, but are not intended to limit the scope of the invention in any aspect.

EXAMPLE 1

Stage 1 of an acrylic polymer was prepared as follows. A monomer emulsion was prepared by adding 26.5 kg of an anionic surfactant and 101.8 kg of water to a 2,200 L vessel equipped with multiple impellers. With continued agitation, the monomer emulsion was formed by adding, in sequence, 153.5 kg of alkyl (meth)acrylate monomer A, 21.2 kg glacial (meth)acrylic acid, 383.5 kg alkyl (meth)acrylate monomer B, 48.5 kg of alkyl (meth)acrylate monomer C, 4.8 kg of 28% aqueous ammonia solution, and 61.3 kg of de-ionized water to rinse the feed lines to the monomer emulsion vessel. Agitation of the monomer emulsion was continued throughout the polymerization.

The polymerization of the monomer emulsion was carried by charging a 2,200 L stainless steel reactor equipped with a single pitched blade agitator and multiple feed inputs with 504.5 kg of de-ionized water at 69–71° C. With agitation the following were added to the reactor: surfactant (10.9 kg followed by 22.7 kg de-ionized water rinse) and reaction inhibitor (0.02 kg in 4.5 kg de-ionized water followed by 4.5 kg de-ionized water rinse). With the temperature of the reactor contents at 69–71° C., the following solutions/mixtures were added to the reactor in rapid succession: 29.6 kg of the monomer emulsion described above, reaction promoter solution (0.01 kg of an iron salt and 0.06 kg of an EDTA derivative in 2.3 kg de-ionized water followed by 2.3 kg de-ionized water rinse), initial catalyst solution (0.12 kg ammonium persulfate and 0.09 kg of tert-butyl hyperoxide in 4.6 kg de-ionized water followed by 2.3 kg de-ionized water rinse), and initial activator solution (0.10 kg sodium bisulfite and 0.04 kg of sodium hydrosulfite in 4.6 kg de-ionized water/2.3 kg de-ionized water rinse). After a an induction period of less than two minutes the polymerization began and the initial exotherm was monitored. At the peak of the temperature exotherm three feed streams were started: 1) the remainder of the monomer emulsion as described above; 2) an initiator solution (0.73 kg of tertiary-butyl hydroperoxide in 50.0 kg de-ionized water); and 3) an activator solution (0.68 kg of sodium bisulfite in 49.1 kg of de-ionized water). A target feed time for the monomer emulsion stream (1) was 45 minutes, while the feed times for the initiator (2) and activator (3) solutions were 50 minutes each. During polymerization, temperature was maintained in the range of 68–70° C., and in-process monomer level was monitored. The feed rates of the three co-feed streams were adjusted in order to keep the in-process monomer below 7% wt. Analysis of the resulting polymer provided a pH in the range of 5.0 to 6.5; particle size by laser light scattering using a BI-90 (manufactured by Brookhaven Instruments Corporation) of $\leq 140$ nm, and total unreacted monomer of less than 2.0% wt. The emulsion polymer obtained from this polymerization was used as the first stage for a subsequent polymerization step

EXAMPLE 2

Four lots, Samples 1–3 and a Comparative, of a (meth) acrylate emulsion polymer were prepared using a standard emulsion polymerization process. In each of Samples 1–3, the amount of in-process monomer was monitored and controlled such that the amount of in-process monomer did not exceed 8% wt, based on the total weight of the reaction mixture. The particle size of the resulting polymer particles was also determined. The results were compared to a lot of the same polymer (Comparative) prepared according to the same procedure, except that the level of in-process monomer was not controlled. The results are reported in Table 1.

TABLE 1

| Sample | Polymer Particle Size | In-Process Monomer Level |
| --- | --- | --- |
| Comparative | large | <10.0% |
| 1 | small | $\leq 5.4\%$ |
| 2 | very small | °2.0% |
| 3 | small | $\leq 7.2\%$ |

The above data clearly show that when the in-process level of an unstable pre-emulsified monomer is less than about 8% wt, the resulting polymer product has the desired small particle size.

EXAMPLE 3

Four lots, Samples 4–7, of a (meth)acrylate emulsion polymer were prepared at varying particle sizes using a standard emulsion polymerization process. In each sample, the resulting polymer contained the same amount of solids on a weight percent basis. The resulting polymers are reported in Table 2.

TABLE 2

| Sample | Polymer Particle Size | Solids (%) | Latex Viscosity (cps) |
| --- | --- | --- | --- |
| 4 | very small | 43.0 | 92 |
| 5 | small | 43.1 | 53 |
| 6 | small | 43.1 | 42 |
| 7 | large | 42.9 | 33 |

The polymers were then formulated into joinery compounds by combining the emulsion polymer with an polyurethane thickener. The weight of the material was kept constant in each of the formulations. The viscosity of each sample was measured on a Brookfield viscometer after 1 and 14 days. These data are reported in Table 3.

TABLE 3

| Sample | Formulation Solids (%) | Formulation Viscosity - Day 1 | Formulation Viscosity - Day 14 |
|---|---|---|---|
| 4 | 33.2 | 5100 cps | 4260 cps |
| 5 | 33.3 | 4240 cps | 3460 cps |
| 6 | 33.3 | 4100 cps | 3280 cps |
| 7 | 33.2 | 2700 cps | 2260 cps |

The above data clearly show that as the particle size increases, the viscosity goes lower in both the 1 day and 14 day measurements. The lower limit of acceptable viscosity in these formulated joinery compounds is 3000 cps. Thus, sample 7 gives unacceptable formulated viscosity. In comparison, Samples 4–6, where the particle size was kept below 140 nm, gave good formulated viscosities.

The viscosity of Sample 7 could not be improved by the addition of further amounts of polyurethane thickener as excess thickener adversely impacted other performance properties of the formulation. Thus, only control of the in-process monomer level provided consistently acceptable formulated products.

EXAMPLE 4

20000 Pounds of hot water was charged into 3000-gallon reactor equipped with an agitator and a circulation tempered water jacket cooling system. The reactor temperature was 98.17° C. The cooling water in the jacket was turned on for 25 minutes. The reactor temperature was 82.19° C. after 25 minutes of cooling. The thermal energy removal from the hot water in the reactor was calculated as:

20000*1.8*(98.17−82.19)=575280 BTU.

This is the true value of heat transfer.

The jacket heat removal rate can be calculated according the equations described above. Three jacket water heat removal rates ($Q_{jss}$, $Q_{jdyn}$ (raw) and $Q_{jdyn}$) in BTU/minute were computed using the same set of process data which included measurements of jacket inlet and outlet temperatures and jacket cooling water flow rate, but with different equations.

Method One (comparative) is the total jacket thermal energy removal (BTU) computed by integration of $Q_{jss}$ ($Q_{jss}$ expressed as BTU per minute) over 25 minutes. Method Two (Invention) is the total jacket thermal energy removal (BTU) computed by integration of $Q_{jdyn}$ ($Q_{jdyn}$ expressed as BTU per minute) over 25 minutes. Method Three (comparative) is the total jacket thermal energy removal (BTU) computed by integration of $Q_{jdyn}$ (raw) ($Q_{jdyn}$ (raw) expressed as BTU per minute) over 25 minutes. Each method is compared to the true value of true heat removal from the reactor (575280 BTU). Only Method Two uses U, the heat transfer coefficient. The results are reported in Table 4.

TABLE 4

| Umax value BTU/(ft$^2$*Hour*F) | Comments on Umax value | Method One Error (%) (Comparative) | Method Two Error (%) (Invention) | Method Three Error (%) (Comparative) |
|---|---|---|---|---|
| 160 | Base case | 42.7 | 2.1 | 9 |
| 192 | Use Umax 20% higher value than base case to cap U in $Q_{jdyn}$ computation | 42.7 | 3.7 | 9 |
| 224 | Use Umax 40% higher value than base case to cap U in $Q_{jdyn}$ computation | 42.7 | 4.6 | 9 |

The above data clearly show that the heat removal computed by integration of $Q_{jdyn}$ (expressed as BTU per minute) provided a heat removal rate that was very close to the actual heat removal value, whereas the comparative methods provided heat removal rates that were significantly different from the actual value.

EXAMPLE 5

38222 Pounds of hot water was charged into 6000-gallon reactor equipped with an agitator and a once through cooling water jacket. The reactor temperature was 84.71° C. The cooling water in the jacket was turned on for 25 minutes. The reactor temperature was 65.71° C. after 25 minutes of cooling. The thermal energy removal from the hot water in the reactor can be calculated as:

38222*1.8*(84.71−65.71)=1307192 BTU.

This is the true value of heat transfer.

The jacket heat removal rate was calculated according the equations described above. Three jacket water heat removal rates ($Q_{jss}$, $Q_{jdyn}$ (raw) and $Q_{jdyn}$) in BTU/minute were computed using the same set of process data which included measurements of jacket inlet and outlet temperatures and jacket cooling water flow rate, but with different equations.

Method One (comparative) is the total jacket thermal energy removal (BTU) computed by integration of $Q_{jss}$ ($Q_{jss}$ expressed as BTU per minute) over 25 minutes. Method Two (Invention) is the total jacket thermal energy removal (BTU) computed by integration of $Q_{jdyn}$ ($Q_{jdyn}$ expressed as BTU per minute) over 25 minutes. Method Three (comparative) is the total jacket thermal energy removal (BTU) computed by integration of $Q_{jdyn}$ (raw) ($Q_{jdyn}$ (raw) expressed as BTU per minute) over 25 minutes. Each method is compared to the true value of true heat removal from the reactor (1307192 BTU). Only Method Two uses U, the heat transfer coefficient. The results are reported in Table 5.

TABLE 5

| Umax value BTU/(ft²*Hour*F) | Comments on Umax value | Method One Error (%) (Comparative) | Method Two Error (%) (Invention) | Method Three Error (%) (Comparative) |
|---|---|---|---|---|
| 160 | Base case | 35.7 | −4.8 | 12.5 |
| 192 | Use Umax 20% higher value than base case to cap U in $Q_{jdyn}$ computation | 35.7 | −4 | 12.5 |
| 224 | Use Umax 40% higher value than base case to cap U in $Q_{jdyn}$ computation | 35.7 | −2.4 | 12.5 |

The above data clearly show that the heat removal computed by integration of $Q_{jdyn}$ (expressed as BTU per minute) provided a heat removal rate that was very close to the actual heat removal value, whereas the comparative methods provided heat removal rates that were significantly different from the actual value.

What is claimed:

1. A method of controlling standing monomer level in a polymerization reaction including the steps of a) detecting coolant temperature at a cooling jacket inlet; b) detecting coolant temperature at a cooling jacket outlet; c) detecting coolant flow rate; d) calculating $Q_{jdyn}$ (raw) and $U_{raw}$ wherein $U_{raw}$ is capped such that $U_{min} < U_{raw} < U_{max}$; e) obtaining $U_{filt}$ by inputting $U_{raw}$ into a low pass first order filter, f) calculating, using the values obtained in steps a through e, a value for the dynamic jacket heat removal; g) calculating a heat release value of polymerization using the dynamic jacket heat removal value; h) comparing the calculated heat release value of polymerization to a target heat release value of polymerization; i) calculating, using the value obtained in step h, the level of in-process monomer in the polymerization reaction; and j) controlling the rate of monomer addition to the polymerization reaction, based upon a comparison the value obtained in Step i with a target in-process monomer level, such that a desired level of in-process monomer is maintained.

2. The method of claim 1 wherein the polymerization reaction is an emulsion polymerization.

3. The method of claim 1 wherein the level of in-process monomer is less than about 8% wt, based on the total weight of the reaction mixture.

* * * * *